United States Patent
Li et al.

(10) Patent No.: US 11,985,251 B2
(45) Date of Patent: May 14, 2024

(54) DATA SYNCHRONIZATION METHOD AND APPARATUS, COMPUTER DEVICE, AND READABLE STORAGE MEDIUM

(71) Applicant: Tencent Technology (Shenzhen) Company Limited, Shenzhen (CN)

(72) Inventors: Maocai Li, Shenzhen (CN); Zongyou Wang, Shenzhen (CN); Hu Lan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 488 days.

(21) Appl. No.: 17/145,829

(22) Filed: Jan. 11, 2021

(65) Prior Publication Data
US 2021/0167970 A1    Jun. 3, 2021

Related U.S. Application Data

(63) Continuation of application No. PCT/CN2020/078348, filed on Mar. 9, 2020.

(30) Foreign Application Priority Data

Mar. 15, 2019   (CN) .......................... 201910196407.9

(51) Int. Cl.
H04L 9/32      (2006.01)
G06F 16/23     (2019.01)

(52) U.S. Cl.
CPC ............ *H04L 9/3247* (2013.01); *G06F 16/23* (2019.01)

(58) Field of Classification Search
CPC ......... H04L 9/3247; H04L 9/50; H04L 63/12; H04L 9/3239; H04L 63/0245;
(Continued)

(56) References Cited

U.S. PATENT DOCUMENTS 10,810,183 B1 * 10/2020 Cunningham ...... G06F 16/2379
10,810,314 B1 * 10/2020 Marotz ................... G06F 16/22
(Continued)

FOREIGN PATENT DOCUMENTS

CN      103490978 A  *  1/2014
CN      103490978 A     1/2014
(Continued)

OTHER PUBLICATIONS

Tencent Technology, ISR, PCT/CN2020/078348, Jun. 4, 2020, 3 pgs.
(Continued)

*Primary Examiner* — Khalid M Almaghayreh
(74) *Attorney, Agent, or Firm* — Morgan, Lewis & Bockius LLP

(57) ABSTRACT

Disclosed is a data synchronization method performed by a computer device, the method including: receiving a piece of transaction data, the piece of transaction data carrying an update operation identifier and a predefined phrase corresponding to the update operation identifier; obtaining, in a case that a target block including the piece of transaction data is stored into a blockchain of a blockchain system, the update operation identifier and the predefined phrase in the target block; and updating a predefined phrase database according to the update operation identifier and the predefined phrase in the target block.

20 Claims, 4 Drawing Sheets

(58) Field of Classification Search
CPC ..... H04L 63/0407; G06F 16/23; G06F 16/27; G06F 16/182; G06F 16/1865; G06F 16/24565; G06F 16/248; G06Q 40/04
See application file for complete search history.

(56) References Cited

U.S. PATENT DOCUMENTS

| | | | |
|---|---|---|---|
| 2012/0278282 A1* | 11/2012 | Lu | G06F 16/273 707/634 |
| 2016/0147782 A1* | 5/2016 | Roseman | G06F 16/16 707/822 |
| 2016/0224259 A1* | 8/2016 | Ahrens | G06F 3/067 |
| 2017/0358168 A1 | 12/2017 | Fan et al. | |
| 2018/0144292 A1* | 5/2018 | Mattingly | G06F 16/903 |
| 2018/0204213 A1* | 7/2018 | Zappier | H04L 63/08 |
| 2018/0227116 A1* | 8/2018 | Chapman | G06F 21/64 |
| 2018/0253452 A1* | 9/2018 | Callan | H04L 9/14 |
| 2019/0050810 A1 | 2/2019 | Nagalla et al. | |
| 2019/0052453 A1 | 2/2019 | De Ligt | |
| 2019/0171650 A1* | 6/2019 | Botev | G06F 16/2358 |
| 2020/0026862 A1* | 1/2020 | Zhang | H04L 9/3239 |
| 2020/0160289 A1* | 5/2020 | Mahajan | G06Q 20/02 |
| 2021/0174432 A1* | 6/2021 | Gonnaud | G06Q 20/401 |

FOREIGN PATENT DOCUMENTS

| | | | | |
|---|---|---|---|---|
| CN | 107623714 | A | * 1/2018 | ............ H04L 29/06 |
| CN | 107623714 | A | 1/2018 | |
| CN | 107862076 | A | 3/2018 | |
| CN | 108052529 | A | 5/2018 | |
| CN | 108921556 | A | 11/2018 | |
| CN | 108985772 | A | * 12/2018 | ........... G06Q 20/401 |
| CN | 108985772 | A | 12/2018 | |
| CN | 109194633 | A | 1/2019 | |
| CN | 109241192 | A | 1/2019 | |
| CN | 109241768 | A | 1/2019 | |
| CN | 109325764 | A | 2/2019 | |
| CN | 109933629 | A | 6/2019 | |
| KR | 20180137250 | A | 12/2018 | |

OTHER PUBLICATIONS

Tencent Technology, KR Office Action, Korean Patent Application No. 10-2021-7006086, Oct. 6, 2022, 15 pgs.

Tencent Technology, WO, PCT/CN2020/078348, Jun. 4, 2020, 5 pgs.

Tencent Technology, IPRP, PCT/CN2020/078348, Sep. 16, 2021, 6 pgs.

Tencent Technology, Singapore Office Action, SG Patent Application No. 11202101569V, Nov. 9, 2023, 8 pgs.

* cited by examiner

DATA SYNCHRONIZATION METHOD AND APPARATUS, COMPUTER DEVICE, AND READABLE STORAGE MEDIUM

CROSS REFERENCE TO RELATED APPLICATIONS

This application is a continuation application of PCT Patent Application No. PCT/CN2020/078348, entitled "DATA SYNCHRONIZATION METHOD AND APPARATUS, COMPUTER DEVICE AND READABLE STORAGE MEDIUM" filed on Mar. 9, 2020, which claims priority to Chinese Patent Application No. 201910196407.9, filed with the State Intellectual Property Office of the People's Republic of China on Mar. 15, 2019, and entitled "DATA SYNCHRONIZATION METHOD AND APPARATUS, COMPUTER DEVICE, AND READABLE STORAGE MEDIUM", all of which are incorporated herein by reference in their entirety.

FIELD OF THE TECHNOLOGY

This application relates to the field of blockchain technology, and in particular, to a data synchronization method and apparatus, a computer device, and a non-transitory computer-readable storage medium.

BACKGROUND OF THE DISCLOSURE

With the development of network technology, people may search data on networks through a browser to obtain information. However, some data carries sensitive phrases. When displaying to-be-searched data to a user, a device equipped with a browser filters out the sensitive phrases in the to-be-searched data, and displays to-be-searched data obtained after filtering to the user, to avoid the wide spread of sensitive phrases.

At present, the device equipped with a browser may filter out the sensitive phrases in the to-be-searched data by using a remote sensitive phrase filtering system. However, each time the to-be-searched data needs to be filtered, the device equipped with a browser needs to complete filtering by reaching out to the remote sensitive phrase filtering system, and waiting for a filtering result fed back by the sensitive phrase filtering system. In this case, the device has a long wait time, so that the efficiency of filtering out sensitive phrases by the device is low. Therefore, there is a need for adopting local sensitive phrase databases and a method for synchronizing sensitive phrase databases across networks.

SUMMARY

According to various embodiments provided in this application, a data synchronization method and apparatus, a computer device, and a readable storage medium are provided.

According to a first aspect of this application, a data synchronization method is performed by a computer device, the method including:
   receiving a piece of transaction data, the piece of transaction data carrying an update operation identifier and a predefined phrase corresponding to the update operation identifier;
   obtaining, in a case that a target block including the piece of transaction data is stored into a blockchain of a blockchain system, the update operation identifier and the predefined phrase in the target block; and
   updating a predefined phrase database according to the update operation identifier and the predefined phrase in the target block.

According to a second aspect of this application, a data synchronization apparatus is provided, including:
   a receiving module, configured to receive a piece of transaction data, the piece of transaction data carrying an update operation identifier and a predefined phrase corresponding to the update operation identifier;
   an obtaining module, configured to obtain, in a case that a target block including the piece of transaction data is stored into a blockchain of a blockchain system, the update operation identifier and the predefined phrase in the target block; and
   an update module, configured to update a predefined phrase database according to the update operation identifier and the predefined phrase in the target block.

According to a third aspect of this application, a non-volatile computer-readable storage medium storing computer-readable instructions is provided, the computer-readable instructions, when executed by one or more processors, causing the one or more processors to perform the steps of the data synchronization method.

According to a fourth aspect of this application, a computer device is provided, including a memory and a processor, the memory storing computer-readable instructions, the computer-readable instructions, when executed by the processor, causing the processor to perform the steps of the data synchronization method.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings according to these accompanying drawings without creative efforts.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are merely used to explain this application but are not intended to limit this application.

Figure 1:
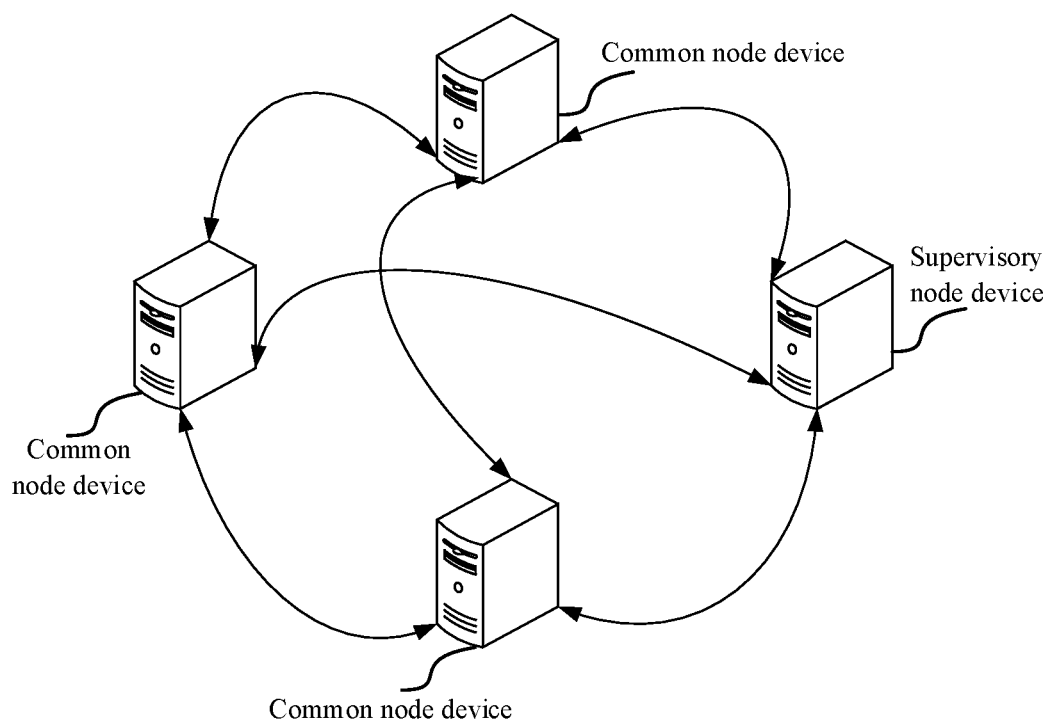
FIG. 1 is a schematic diagram of a blockchain system according to an embodiment of this application.

FIG. 1 is a schematic diagram of a blockchain system according to an embodiment of this application. Referring to FIG. 1, the blockchain system is formed by at least two node devices. The at least two node devices may belong to different users. Any node device may generate or receive transaction data, package at least one piece of transaction data, generate a block, and store a block on which a consensus is reached. The transaction data may be data of any type, and any content may be included in the transaction data. Any data received or generated by any node device in the blockchain system may be referred to as transaction data.

Node devices in the blockchain system may have different functions in the blockchain system, and the node devices may include a supervisory node device and a common node device. A supervisory node device may act as a supervisor to publish transaction data carrying a predefined phrase, e.g., a sensitive phrase, in the blockchain system, so that another node device may update a local sensitive phrase database according to the sensitive phrase published by the supervisory node device.

Any node device can provide a user with a search service, so that the user may search transaction data in each block on a blockchain in the blockchain system on any node device. When any node device displays transaction data in a to-be-searched block to the user, the node device may filter out a sensitive phrase in the transaction data in the to-be-searched block according to a sensitive phrase in the local sensitive phrase database, and finally display transaction data obtained after filtering to the user.

Figure 2:
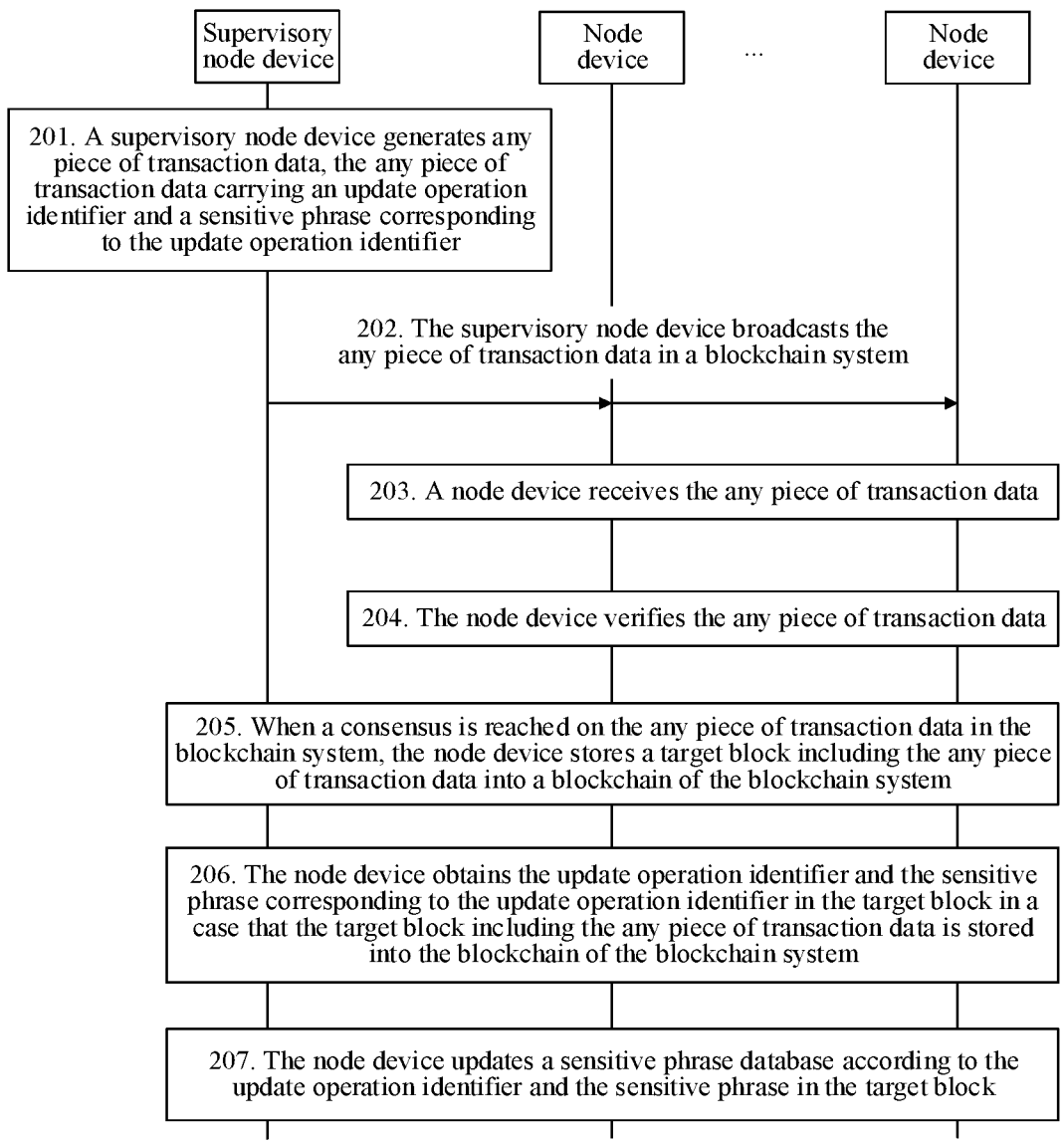
FIG. 2 is a flowchart of a data synchronization method according to an embodiment of this application.

The above is a description of the blockchain system and the node devices. To reflect a process in which a node device in the blockchain system stores a sensitive phrase published by a supervisory node device into the local sensitive phrase database, FIG. 2 is a flowchart of a data synchronization method according to an embodiment of this application. The method specifically includes the following steps:

201. A supervisory node device generates a piece of transaction data, the piece of transaction data carrying an update operation identifier and a sensitive phrase corresponding to the update operation identifier.

The supervisory node device may be any node device with supervisory authority in the blockchain system. The update operation identifier may be used for indicating an update operation that a node device needs to perform. The update operation identifier may be an addition identifier or may be a deletion identifier. The addition identifier is used for instructing to add a sensitive phrase to the sensitive phrase database. The deletion identifier is used for instructing to delete a sensitive phrase from the sensitive phrase database.

In a possible implementation, the update operation identifier may be any character string or may be represented in another form, and different character strings used for representing update operation identifiers may be used for representing different update operations. For example, Add represents an addition operation, and Delete represents a deletion operation.

Any node device in the blockchain system is equipped with a sensitive phrase database. The sensitive phrase database is used for storing a sensitive phrase. The sensitive phrase may be any phrase. The content of the sensitive phrase is not limited in this embodiment of this application.

When the supervisory node device receives a-piece-of-transaction-data generation request, the supervisory node device performs step 201. The a-piece-of-transaction-data generation request is used for requesting to generate a piece of transaction data carrying a sensitive phrase. In a possible implementation, the supervisory node device receives a-piece-of-transaction-data generation request, and the a-piece-of-transaction-data generation request includes an update operation identifier and a sensitive phrase corresponding to the update operation identifier. The supervisory node device generates, based on the update operation identifier in the a-piece-of-transaction-data generation request and the sensitive phrase corresponding to the update operation identifier, a piece of transaction data that meets a format requirement of transaction data in the blockchain system.

The operation that the supervisory node device receives the a-piece-of-transaction-data generation request may be triggered by a storage operation of the user. For example, when the user selects an update option in a user interface of the supervisory node device, enters a sensitive phrase in a phrase position corresponding to the update option, and then clicks a storage option, the a-piece-of-transaction-data generation request may be triggered.

The a piece of transaction data may further include a supervision identifier, to indicate that the piece of transaction data is generated by the supervisory node device. The supervision identifier includes a signature of the supervisory node device or an address of the supervisory node device. The signature of the supervisory node device may be a signature added to a piece of transaction data by the supervisory node device using a private key. The address of the supervisory node device may be an Internet Protocol (IP) address of the supervisory node device or may be another address capable of representing the identity of the supervisory node device. The supervision identifier is not specifically limited in this embodiment of this application.

In a possible implementation, the supervisory node device adds the address thereof to an initiation address field of the piece of transaction data. The supervisory node device adds the update operation identifier and the sensitive phrase corresponding to the update operation identifier to a remark information field of the piece of transaction data.

In a possible implementation, the supervisory node device adds the update operation identifier and the sensitive phrase corresponding to the update operation identifier to the remark information field of the piece of transaction data, and uses the private key of the supervisory node device to add a signature to a piece of transaction data to which remark information is added.

When adding the update operation identifier and the sensitive phrase corresponding to the update operation identifier to a remark information field of target transaction data, the supervisory node device may enable the update operation identifier and the sensitive phrase corresponding to the update operation identifier to be in the same row, so that the update operation identifier corresponds to the sensitive phrase. For example, Add is used as the addition identifier, Delete is used as the deletion identifier, and the remark information is represented in the form of a table. Referring to the remark information shown in Table 1, it can be seen from Table 1 that sensitive phrases 1 to n in the first row all correspond to the addition identifier Add, and sensitive phrases 1 to n in the second row all correspond to the deletion identifier Delete.

TABLE 1

| Update operation identifier | Sensitive phrase 1 | Sensitive phrase 2 | . . . | Sensitive phrase n |
|---|---|---|---|---|
| Add | xxx | yyy | . . . | zzz |
| Delete | mmm | nnn | | ttt |

The form of the remark information and a quantity of sensitive phrases in the remark information are not specifically limited in this embodiment of this application. In addition, the supervisory node device may alternatively add an update operation identifier and a sensitive phrase corresponding to the update operation identifier to another field in the piece of transaction data. The positions of the update operation identifier and the sensitive phrase corresponding to the update operation identifier in the piece of transaction data are not limited in this embodiment of this application.

The supervisory node device may further encrypt the sensitive phrase corresponding to the update operation identifier. In a possible implementation, the supervisory node device encrypts the sensitive phrase corresponding to the update operation identifier by using a preset encryption algorithm, to obtain an encrypted sensitive phrase. The supervisory node device generates the piece of transaction data based on the encrypted sensitive phrase and the update operation identifier. The preset encryption algorithm is not specifically limited in this embodiment of this application.

In this case, after the piece of transaction data is stored on the blockchain, a common user without the knowledge of a decryption algorithm cannot decrypt the encrypted sensitive phrase in the piece of transaction data, thereby avoiding the wide spread of the sensitive phrase in the piece of transaction data.

202. The supervisory node device broadcasts the piece of transaction data in a blockchain system.

Step 202 enables another node device other than the supervisory node device to receive the piece of transaction data.

203. A node device receives the piece of transaction data.

It is to be understood that all node devices on the blockchain receive the piece of transaction data.

204. The node device verifies the piece of transaction data.

The node device is another node device other than the supervisory node device in the blockchain system. The node device can verify a piece of transaction data by verifying the update operation identifier carried in the piece of transaction data. When the update operation identifier carried in the piece of transaction data is verified, the piece of transaction data is verified, or otherwise the piece of transaction data fails to be verified.

It is to be understood that some of the node devices of the blockchain may not verify the piece of transaction data, and may not package the piece of transaction data into a block.

In a possible implementation, when the form of the update operation identifier carried in the piece of transaction data is verified, the piece of transaction data is verified, or otherwise the piece of transaction data fails to be verified. For example, Add is used as the addition identifier, and Delete is used as the deletion identifier. When the update operation identifier carried in the piece of transaction data is Add or Delete, the piece of transaction data is verified, or otherwise the piece of transaction data fails to be verified.

When the piece of transaction data carries the supervision identifier, the node device may verify the piece of transaction data by verifying the supervision identifier carried in the piece of transaction data. When the supervision identifier carried in the piece of transaction data is verified, the piece of transaction data is verified, or the piece of transaction data fails to be verified.

The node device may verify the supervision identifier in the target transaction data in Manner 1 or 2 below.

Manner 1. The node device verifies the supervision identifier carried in the piece of transaction data by using supervision information of the supervisory node device stored in a genesis block on the blockchain configured on the node device.

The supervision information includes a public key of all supervisory node devices or addresses of all supervisory node devices in the blockchain system, and is used for indicating the identity of the node device with supervisory authority. In an initialization phase of the blockchain system, the supervision information of the supervisory node device may be stored in the genesis block, so that any node device in the blockchain system can learn which node device has supervisory authority.

In a possible implementation, when the supervision identifier carried in the piece of transaction data is a signature of the supervisory node device, and a public key of the supervisory node device is stored in the genesis block of the blockchain configured by the node device, the supervision identifier is verified, or otherwise the supervision identifier fails to be verified.

In a possible implementation, when the supervision identifier carried in the piece of transaction data is an address of the supervisory node device, and the address of the supervisory node device is stored in the genesis block of the blockchain configured by the node device, the supervision identifier is verified, or otherwise the supervision identifier fails to be verified.

Manner 2. The node device verifies the supervision identifier in the piece of transaction data by executing a first contract.

The first contract is a smart contract used for verifying the supervision identifier in the blockchain system. When the node device receives a piece of transaction data carrying the supervision identifier, the node device may be triggered to execute the first contract, to verify the supervision identifier carried in the piece of transaction data.

In a possible implementation, when the supervision identifier in the piece of transaction data is a signature of the supervisory node device, and a public key of the supervisory node device is stored in the first contract, the supervision identifier is verified, or otherwise the supervision identifier fails to be verified.

In a possible implementation, when the supervision identifier in the piece of transaction data is an address of the supervisory node device, and the address of the supervisory node device is stored in the first contract, the supervision identifier is verified, or otherwise the supervision identifier fails to be verified.

The node device in the blockchain system verifies the piece of transaction data by using the supervision identifier, so that the transaction data carrying the update operation identifier and the sensitive phrase corresponding to the update operation identifier on the blockchain is completely generated by the supervisory node device, thereby ensuring the credibility of the transaction data carrying the update operation identifier and the sensitive phrase corresponding to the update operation identifier in the blockchain system.

205. When a consensus is reached on the piece of transaction data in the blockchain system, the node device stores a target block including the piece of transaction data into a blockchain of the blockchain system.

In some embodiments, there may be step 205 after step 204. It is to be understood that only a node device that has performed step 204 performs step 205. When most node devices in the blockchain system have verified the piece of transaction data, it can be considered that a consensus is reached on the piece of transaction data in the blockchain system. In a possible implementation, step 205 may be implemented by using the process shown in the following steps 205A and 205B.

Step 205A. When a plurality of node devices in the blockchain system have verified the piece of transaction data, the node device packages the piece of transaction data into the target block.

In some embodiments, when the node device in the blockchain system packages the transaction data carrying the update operation identifier and the sensitive phrase corresponding to the update operation identifier into the target block, a target identifier may be added to the target block, to enable the node device in the blockchain system to obtain the target block on the blockchain based on the target identifier. The target identifier is not specifically limited in this embodiment of this application.

Step 205B. After the plurality of node devices in the blockchain system have reached a consensus on the target block, the node device stores the target block into the blockchain configured by the node device.

After the plurality of node devices in the blockchain system have verified the target block, the plurality of node devices reach a consensus on the target block. Any node device in the blockchain system may verify the target block by using attributes of the target block. The attributes of the target block include a block number, a root hash value, and a quantity of pieces of transaction data in the block.

In a possible implementation, when the attributes of the target block meet a condition of placement into a chain, the target block is verified by the node device, or otherwise the target block fails to be verified. For example, if a block number of the target block is greater by 1 than that of the last block on the blockchain configured by the node device, the target block is verified by the node device.

206. The node device obtains the update operation identifier and the sensitive phrase corresponding to the update operation identifier in the target block in a case that the target block including the piece of transaction data is stored into the blockchain of the blockchain system.

It is to be understood that all node devices on the blockchain may perform step 206. The node device may obtain the update operation identifier and the sensitive phrase corresponding to the update operation identifier in the target block. In a possible implementation, step 206 may be implemented in Manner 3 or 4 below.

Manner 3. The node device obtains at least one piece of transaction data in the target block. When a piece of transaction data in the target block carries an update operation identifier, the node device obtains the update operation identifier and the sensitive phrase from data content of the piece of transaction data.

In a possible implementation, the node device may detect content of remark information field of all transaction data in the target block, and when an update operation identifier is detected in the remark information field of a piece of transaction data in the target block, the node device obtains the data content in the remark information field of the piece of transaction data as the update operation identifier and the sensitive phrase.

Manner 4. The node device obtains at least one piece of transaction data in the target block. When a piece of transaction data in the target block carries a supervision identifier, the node device obtains the update operation identifier and the sensitive phrase from data content of the piece of transaction data.

In a possible implementation, the node device may search initiator addresses of all transaction data in the target block, and when an initiator address of a piece of transaction data is found in addresses of the supervisory node devices stored in the genesis block, the node device obtains the update operation identifier and the sensitive phrase from the data content of the piece of transaction data.

In a possible implementation, the node device may search signatures of all transaction data in the target block, and when it is found that a signature of a piece of transaction data corresponds to a public key of the supervisory node device stored in the genesis block, the node device obtains the update operation identifier and the sensitive phrase from the data content of the piece of transaction data.

The node device needs to obtain the target block on the blockchain configured by the node device before the node device can obtain the update operation identifier and the sensitive phrase corresponding to the update operation identifier in the target block. The node device may obtain the target block on the blockchain in the following manners 5 and 6.

Manner 5. Each time a block is stored on the blockchain configured by the node device, the transaction data in the block is detected. When a piece of transaction data in the block carries an update operation identifier or a supervision identifier, the node device obtains the block as a target block.

The node device may alternatively not perform real-time detection of blocks on the blockchain. In a possible implementation, for every preset duration, the node device detects, within the preset duration, at least one piece of transaction data in at least one block newly stored on the blockchain configured by the node device. When a piece of transaction data in any block carries an update operation identifier or a supervision identifier, the block is obtained as a target block. For example, for every one hour, the node device detects, within the one hour, at least one piece of transaction data in at least one block newly stored on the blockchain configured by the node device. When a piece of transaction data in any block carries an update operation identifier or a supervision identifier, the block is obtained as the target block.

Manner 6. When the node device detects that any block on the blockchain carries the target identifier, the node device obtains the block as the target block. The target block is used for indicating that the block carries the update operation identifier and the sensitive phrase corresponding the update operation identifier.

207. The node device updates a sensitive phrase database according to the update operation identifier and the sensitive phrase in the target block.

Because the update operation identifier in the piece of transaction data may be an addition identifier or may be a deletion identifier, the node device updates the sensitive phrase into the sensitive phrase database in different manners for different update operation identifiers.

In a possible implementation, when the update operation identifier in the piece of transaction data is an addition identifier, the node device adds a sensitive phrase corresponding to the addition identifier to the sensitive phrase database. Table 1 in step 201 is still used as an example. The sensitive phrases 1 to n in the first row of Table 1 all correspond to the addition identifier Add. The node device adds the sensitive phrases 1 to n in the first row of Table 1 to the sensitive phrase database.

Before the node device updates the sensitive phrase database, there may be a sensitive phrase corresponding to the addition identifier in the sensitive phrase database, or there may be no sensitive phrase corresponding to the addition identifier. When there is no sensitive phrase corresponding to the addition identifier in the sensitive phrase database, the node device adds the sensitive phrase corresponding to the addition identifier to the sensitive phrase database.

In a possible implementation, the node device searches the sensitive phrase database according to the sensitive phrase corresponding to the addition identifier in a case that the update operation identifier in the piece of transaction data is the addition identifier. The node device adds the sensitive phrase corresponding to the addition identifier to the sensitive phrase database in a case that the sensitive phrase corresponding to the addition identifier is not included in the sensitive phrase database. The node device may not perform the addition operation in a case that the sensitive phrase corresponding to the addition identifier is included in the sensitive phrase database.

In a possible implementation, when the update operation identifier in the piece of transaction data is a deletion identifier, the node device deletes a sensitive phrase corresponding to the deletion identifier from the sensitive phrase database. Table 1 in step 201 is still used as an example. The sensitive phrases 1 to n in the second row of Table 1 all correspond to the deletion identifier Add. The node device deletes the sensitive phrases 1 to n in the second row of Table 1 from the sensitive phrase database.

The node device may further set a weight for a sensitive phrase in the sensitive phrase database, to indicate the sensitivity of the sensitive phrase. When the weight of the sensitive phrase is larger, the sensitivity of the sensitive phrase is higher. When the weight of the sensitive phrase is smaller, the sensitivity of the sensitive phrase is lower. When there is a sensitive phrase corresponding to the addition identifier in the sensitive phrase database, the node device adds the weight of the sensitive phrase corresponding to the addition identifier to the sensitive phrase database.

The weight of the sensitive phrase may be determined according to a quantity of times that the sensitive phrase is added. In a possible implementation, for any sensitive phrase, each time the node device obtains an addition identifier corresponding to the sensitive phrase, the node device increases the weight of the sensitive phrase by a preset value.

When the sensitive phrase obtained by the node device in the target block is an encrypted sensitive phrase, the node device may decrypt the encrypted sensitive phrase according to a preset decryption algorithm, to obtain a decrypted sensitive phrase. The node device then updates the decrypted sensitive phrase into the sensitive phrase database. The preset decryption algorithm corresponds to the preset encryption algorithm for encrypting the sensitive phrase.

According to the method provided by this embodiment of this application, when the node device in the blockchain system verifies a piece of transaction data carrying a sensitive phrase, and the target block including the transaction data is stored on the blockchain, any node device in the blockchain system may obtain the sensitive phrase in the target block from the blockchain of the blockchain system, and update a sensitive phrase database thereof according to the update operation identifier corresponding to the sensitive phrase, so that the sensitive phrase database can be updated synchronously on any node device. In addition, the node device in the blockchain system verifies the piece of transaction data by using the supervision identifier, so that the transaction data carrying the update operation identifier and the sensitive phrase corresponding to the update operation identifier on the blockchain is completely generated by the supervisory node device, thereby ensuring the credibility of the transaction data carrying the update operation identifier and the sensitive phrase corresponding to the update operation identifier on the blockchain. In addition, weights are set for sensitive phrases in the sensitive phrase database. The sensitivity of the sensitive phrases is represented by the weights of the sensitive phrases, to visually indicate the sensitivity of the sensitive phrases by using quantified data, to facilitate subsequent operations such as data search based on the sensitive phrase database. In addition, each time the node device stores a target block, the node device may obtain the update operation identifier and the sensitive phrase corresponding to the update operation identifier from the target block, so that each node device can update a sensitive phrase database of the node device in real time, thereby avoiding a case that the node device cannot accurately filter block content of a to-be-searched block because the sensitive phrase database is not updated in time. In addition, when the sensitive phrase in the piece of transaction data is an encrypted sensitive phrase, a common user without the knowledge of a decryption algorithm cannot decrypt the encrypted sensitive phrase in the piece of transaction data, thereby avoiding the wide spread of the sensitive phrase in the piece of transaction data.

Figure 3:
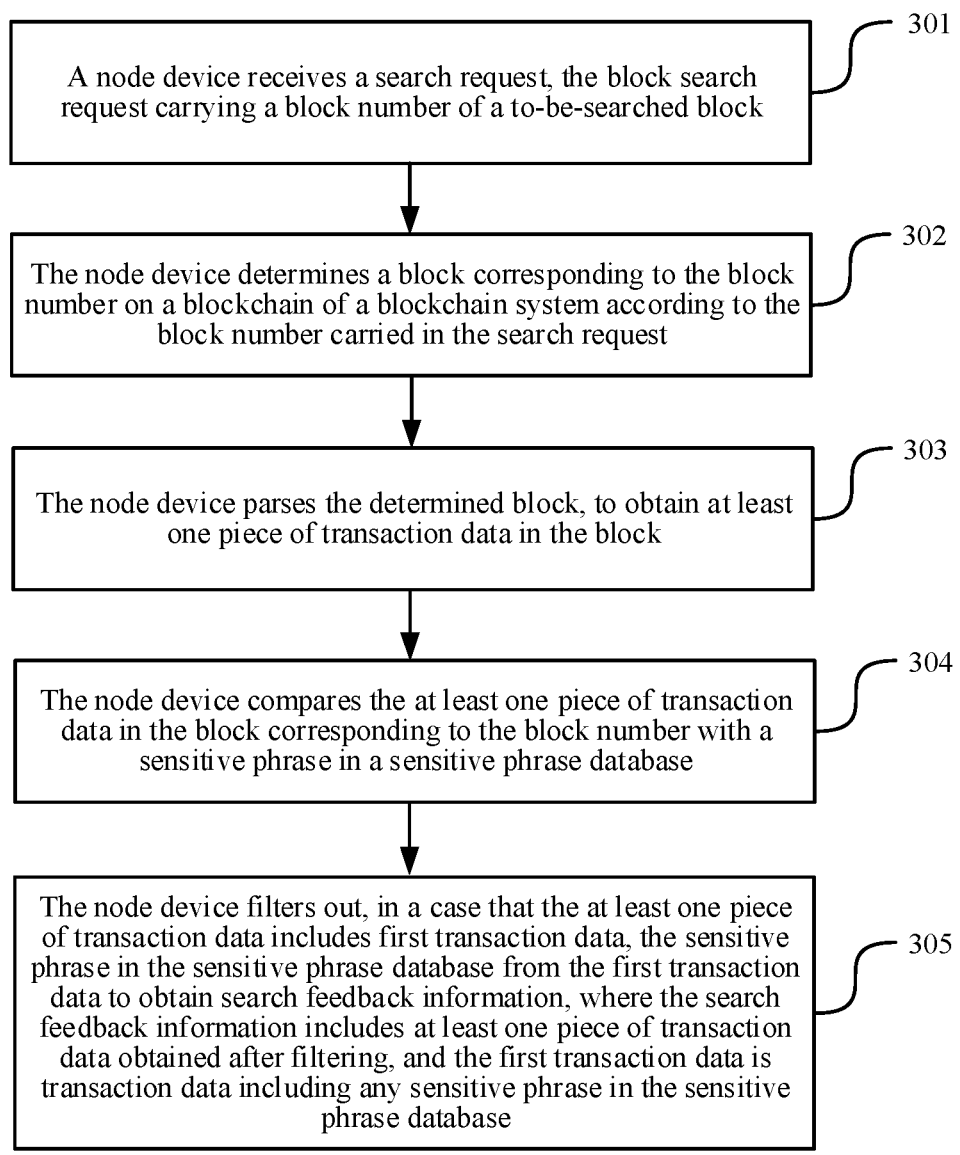
FIG. 3 is a flowchart of a data synchronization-based data search method according to an embodiment of this application.

The node device in FIG. 2 stores a sensitive phrase database locally, so that the node device can filter the block content of the to-be-searched block according to the sensitive phrase database. To further reflect a data search process of the node device based on the sensitive phrase database, FIG. 3 is a flowchart of a data synchronization-based data search method according to an embodiment of this application, and the method specifically includes the following steps:

301. A node device receives a search request, the block search request carrying a block number of a to-be-searched block.

The node device is any node device in the blockchain system. The block number may be a number of the block on the blockchain configured by the blockchain system or may be a block height, for example, a block 001 or a block 002.

302. The node device determines a block corresponding to the block number on a blockchain of a blockchain system according to the block number carried in the search request.

The node device may determine the block corresponding to the block number carried in the search request by searching for a block number of each block on the blockchain configured by the node device. In a possible implementation, when a block number that is the same as the block number carried in the search request is found on the blockchain configured by the node device, a block where the found block number is located is obtained as a first target block, and the first target block is a block that the node device needs to determine.

303. The node device parses the determined block, to obtain at least one piece of transaction data in the block.

304. The node device compares the at least one piece of transaction data in the block corresponding to the block number with a sensitive phrase in a sensitive phrase database.

The node device may perform the comparison based on the weights of the sensitive phrases. In a possible implementation, the node device compares, in descending order of weights of a plurality of sensitive phrases in the sensitive phrase database, the at least one piece of transaction data in the block with the plurality of sensitive phrases one by one. The weights are determined according to quantities of times that the sensitive phrases are added.

Before the comparison, the node device obtains the weights of the sensitive phrases in the sensitive phrase database, and then sorts the weights of the sensitive phrases in descending order. Finally, the node device compares the sorted sensitive phrases with at least one piece of transaction data in the block in the order.

For example, there are three sensitive phrases in the sensitive phrase database. The weight of a sensitive phrase A is 1, the weight of a sensitive phrase B is 2, and the weight of a sensitive phrase C is 3. The node device sorts the sensitive phrases in the sensitive phrase database as: the sensitive phrase C, the sensitive phrase B, and the sensitive phrase A. In this case, the node device first compares at least one piece of transaction data in the block with the sensitive phrase C, then compares at least one piece of transaction data in the block with the sensitive phrase B, and finally compares at least one piece of transaction data in the block with the sensitive phrase A.

305. The node device filters out, in a case that the at least one piece of transaction data includes first transaction data, the sensitive phrase in the sensitive phrase database from the first transaction data to obtain search feedback information, where the search feedback information includes at least one piece of transaction data obtained after filtering, and the first transaction data is transaction data including any sensitive phrase in the sensitive phrase database.

The node device may filter out the sensitive phrase in the transaction data by deleting the sensitive phrase or replacing the sensitive phrase. Next, step 304 may be implemented in Manner 7 or 8 below.

Manner 7. The node device deletes, in a case that the at least one piece of transaction data includes first transaction data, the sensitive phrase in the sensitive phrase database from the first transaction data to obtain search feedback information, where the search feedback information includes at least one piece of transaction data obtained after deletion.

For example, the first transaction data carries the sensitive phrase A in the sensitive phrase database, the node device deletes the sensitive phrase A from the first transaction data, and finally the first transaction data in the obtained search feedback information is deleted first transaction data.

Manner 8. The node device replaces, in a case that the at least one piece of transaction data includes first transaction data, the sensitive phrase in the first transaction data with a target warning phrase to obtain search feedback information, where the search feedback information includes at least one piece of transaction data obtained after deletion.

The target warning phrase may be represented by any character string, such as "******" or "the information herein is sensitive information", and is used for indicating a sensitive phrase. The content of the target warning phrase is not specifically limited in this embodiment of this application.

For example, the first transaction data carries the sensitive phrase A in the sensitive phrase database, the node device replaces the sensitive phrase A in the first transaction data with a sensitive phrase "******". Finally, the first transaction data in the obtained search feedback information is deleted first transaction data.

The node device may further display the search feedback information on a display interface of the node device for the user to check. A specific form of displaying the search feedback information is not limited in this embodiment of this application.

The above process is a process in which the node device filters out sensitive phrases in the to-be-searched block based on the local sensitive phrase database. In a possible implementation, the node device may alternatively filter out the sensitive phrases in the to-be-searched block by executing the smart contract in the blockchain system. The smart contract for filtering the sensitive phrases in the to-be-searched block is not specifically limited in this embodiment of this application. The smart contract may be maintained by a user with supervisory authority without the need of maintenance by other node devices.

According to the method provided in this embodiment of this application, the transaction data in the to-be-searched block is compared with the sensitive phrase in the sensitive phrase database, and the transaction data carrying the sensitive phrase in the to-be-searched block is filtered, so that the node device displays transaction data obtained after filtering to the user. Each node device in the blockchain system stores a sensitive phrase database, so that any node device in the blockchain system can filter out the sensitive phrase in the to-be-searched block based on the sensitive phrase database thereof, thereby avoiding the wide spread of sensitive phrases on the blockchain. In addition, when the node device in the blockchain system filters out the sensitive phrase in the to-be-searched block by using the smart contract, only the user with supervisory authority needs to maintain the smart contract without the need of maintenance by other node devices, thereby reducing the service load of other node devices. Moreover, the node device filters to-be-searched data only according to the local sensitive phrase database, so that it is not necessary to spend a lot of time, thereby improving the filtering efficiency of the node device.

Any combination of the foregoing optional technical solutions may be used to obtain an optional embodiment of the present disclosure. Details are not described herein.

Figure 4:
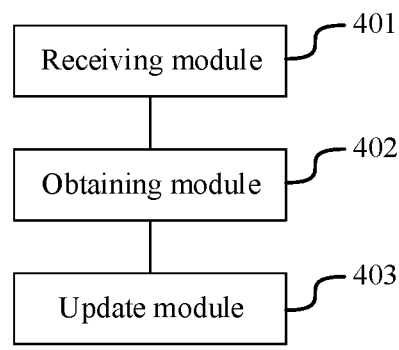
FIG. 4 is a schematic structural diagram of a data synchronization apparatus according to an embodiment of this application.

FIG. 4 is a schematic structural diagram of a data synchronization apparatus according to an embodiment of this application. FIG. 4 includes a receiving module 401, an obtaining module 402, and an update module 403. Modules included in the data synchronization apparatus may be implemented entirely or partly by software, hardware, or a combination thereof.

The receiving module 401 is connected to the obtaining module 402, and is configured to receive a piece of transaction data, the piece of transaction data carrying an update operation identifier and a sensitive phrase corresponding to the update operation identifier.

The obtaining module 402 is connected to the update module 403, and is configured to obtain, in a case that a target block including the piece of transaction data is stored into a blockchain of a blockchain system, the update operation identifier and the sensitive phrase in the target block.

The update module 403 is configured to update a sensitive phrase database according to the update operation identifier and the sensitive phrase in the target block.

In some embodiments, the update module 403 includes:
an addition unit, configured to add, in a case that the update operation identifier in the piece of transaction data is an addition identifier, a sensitive phrase corresponding to the addition identifier to the sensitive phrase database; or
a deletion unit, configured to delete, in a case that the update operation identifier in the piece of transaction data is a deletion identifier, a sensitive phrase corresponding to the deletion identifier from the sensitive phrase database.

In some embodiments, the addition unit is configured to: search the sensitive phrase database according to the sensitive phrase corresponding to the addition identifier in a case that the update operation identifier in the piece of transaction data is the addition identifier, and add the sensitive phrase corresponding to the addition identifier to the sensitive phrase database in a case that the sensitive phrase corresponding to the addition identifier is not included in the sensitive phrase database.

In some embodiments, the obtaining module 402 is configured to obtain, in a case that a piece of transaction data in the target block carries a supervision identifier, data content of the piece of transaction data as the update operation identifier and the sensitive phrase.

In some embodiments, the supervision identifier includes a signature of the supervisory node device or an address of the supervisory node device.

In some embodiments, the apparatus further includes:
a determination module, configured to determine, according to a block number carried in a search request, a block corresponding to the block number on the blockchain of the blockchain system;
a comparison module, configured to compare at least one piece of transaction data in the block corresponding to the block number with a sensitive phrase in the sensitive phrase database; and
a filtering module, configured to filter out, in a case that the at least one piece of transaction data includes first transaction data, the sensitive phrase in the sensitive phrase database from the first transaction data to obtain search feedback information, where the search feedback information includes at least one piece of transaction data obtained after filtering, and the first transaction data is transaction data including any sensitive phrase in the sensitive phrase database.

In some embodiments, the comparison module is configured to compare, in descending order of weights of a plurality of sensitive phrases in the sensitive phrase database, the at least one piece of transaction data in the block with the plurality of sensitive phrases one by one, where the weights are determined according to quantities of times that the sensitive phrases are added.

In some embodiments, the filtering module is configured for any one of the following:
deleting, in a case that the at least one piece of transaction data includes first transaction data, the sensitive phrase in the sensitive phrase database from the first transaction data to obtain search feedback information, where the search feedback information includes at least one piece of transaction data obtained after deletion; and
replacing, in a case that the at least one piece of transaction data includes first transaction data, the sensitive phrase in the first transaction data with a target warning phrase to obtain search feedback information, where the search feedback information includes at least one piece of transaction data obtained after replacement.

According to the apparatus provided by this embodiment of this application, when the node device in the blockchain system verifies a piece of transaction data carrying a sensitive phrase, and the target block including the transaction data is stored on the blockchain, any node device in the blockchain system may obtain the sensitive phrase in the target block from the blockchain of the blockchain system, and update a sensitive phrase database thereof according to the update operation identifier corresponding to the sensitive phrase, so that the sensitive phrase database can be updated synchronously on any node device. In addition, the node device in the blockchain system verifies the piece of transaction data by using the supervision identifier, so that the transaction data carrying the update operation identifier and the sensitive phrase corresponding to the update operation identifier on the blockchain is completely generated by the supervisory node device, thereby ensuring the credibility of the transaction data carrying the update operation identifier and the sensitive phrase corresponding to the update operation identifier on the blockchain. In addition, each time the node device stores a target block, the node device may obtain the update operation identifier and the sensitive phrase corresponding to the update operation identifier from the target block, so that each node device can update a sensitive phrase database of the node device in real time, thereby avoiding a case that the node device cannot accurately filter block content of a to-be-searched block because the sensitive phrase database is not updated in time. In addition, the transaction data in the to-be-searched block is compared with the sensitive phrase in the sensitive phrase database, and the transaction data carrying the sensitive phrase in the to-be-searched block is filtered, so that the node device displays transaction data obtained after filtering to the user. Each node device in the blockchain system stores a sensitive phrase database, so that any node device in the blockchain system can filter out the sensitive phrase in the to-be-searched block based on the sensitive phrase database thereof, thereby avoiding the wide spread of sensitive phrases on the blockchain. In addition, when the node device in the blockchain system filters out the sensitive phrase in the to-be-searched block by using the smart contract, only the user with supervisory authority needs to maintain the smart contract without the need of maintenance by other node devices, thereby reducing the service load of other node devices.

When the data synchronization apparatus provided in the foregoing embodiments performs data synchronization, merely divisions of the foregoing functional modules are used as an example for description. During actual application, the foregoing functions may be allocated to and completed by different functional modules according to requirements, that is, the internal structure of the apparatus is divided into different functional modules, to complete all or some of the foregoing described functions. In addition, the data synchronization apparatus provided in the foregoing embodiments is based on the same concept as the data synchronization method in the foregoing embodiments. For a specific implementation process, refer to the method embodiments.

Figure 5:
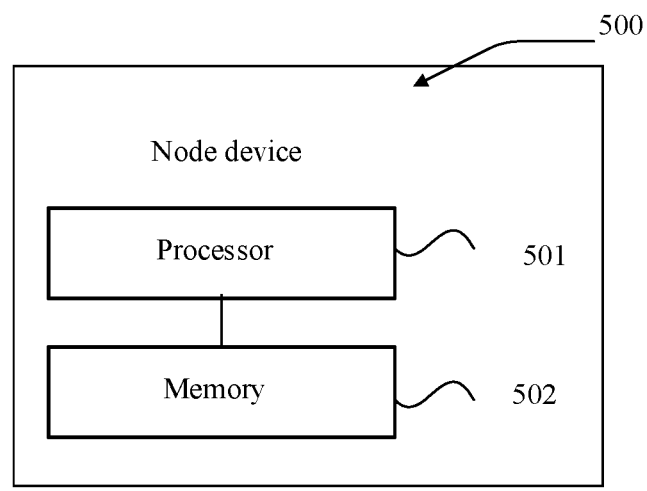
FIG. 5 is a schematic structural diagram of a node device according to an embodiment of this application.

FIG. 5 is a schematic structural diagram of a computer device according to an embodiment of this application. The computer device may be specifically the node device in FIG. 1. The node device 500 may vary greatly due to different configurations or performance, and may include one or more central processing units (CPUs) 501 and one or more memories 502. The memory 502 stores at least one instruction, the at least one instruction being loaded and executed by the processor 501 to implement the methods provided in the foregoing method embodiments. Certainly, the node device may further include components such as a wired or wireless network interface, a keyboard, and an input/output (I/O) interface, to facilitate input and output. The node device may further include another component configured to implement a function of a device. Details are not further described herein.

In an exemplary embodiment, a computer-readable storage medium, for example, a memory including instructions, is further provided. The instructions may be executed by a processor in a terminal, to complete the data synchronization method or data search method in the foregoing embodiments.

In an embodiment, a computer device is provided, including: a memory and a processor. The memory stores computer-readable instructions, and the computer-readable instructions, when executed by the processor, cause the processor to perform the steps in the foregoing image processing method. The steps in the image processing method may be the steps in the image processing method in the foregoing embodiments.

In an embodiment, a computer-readable storage medium is provided. The computer-readable storage medium stores computer-readable instructions, and the computer-readable instructions, when executed by the processor, causing the processor to perform the steps in the foregoing image processing method. The steps in the image processing method may be the steps in the image processing method in the foregoing embodiments.

A person of ordinary skill in the art may understand that all or some procedures in the methods in the foregoing embodiments may be implemented by computer-readable instructions instructing relevant hardware. The program may be stored in a non-volatile computer-readable storage medium. When the program is executed, the procedures of the foregoing method embodiments may be implemented. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or a cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ES-DRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

The foregoing embodiments only describe several implementations of this application, which are described specifically and in detail, and therefore cannot be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the patent of this application is to be subject to the appended claims.

What is claimed is:

1. A data synchronization method, performed by a computer device having a memory and a processor, the memory storing computer-readable instructions to be executed by the processor, the method comprising:
    receiving a piece of transaction data, the piece of transaction data carrying an update operation identifier and a predefined phrase corresponding to the update operation identifier;
    obtaining, in accordance with a determination that a target block comprising the piece of transaction data is stored into a blockchain of a blockchain system, the update operation identifier and the predefined phrase in the target block;
    updating a predefined phrase database according to the update operation identifier and the predefined phrase in the target block comprising:
        in accordance with a determination that the updated operation identifier in the piece of transaction data is a deletion identifier, deleting the predefined phrase corresponding to the deletion identifier from the predefined phrase database;
    determining, according to a block number carried in a search request, a block corresponding to the block number on the blockchain of the blockchain system;
    comparing at least one piece of transaction data in the block corresponding to the block number with the predefined phrase in the predefined phrase database; and
    deleting, in accordance with a determination that the at least one piece of transaction data comprises first transaction data, the predefined phrase in the predefined phrase database from the first transaction data to obtain search feedback information, wherein the search feedback information comprises at least one piece of transaction data obtained after deletion.

2. The method according to claim 1, wherein the updating a predefined phrase database according to the update operation identifier and the predefined phrase in the target block comprises:
    adding, in accordance with a determination that the update operation identifier in the piece of transaction data is an addition identifier, a predefined phrase corresponding to the addition identifier to the predefined phrase database.

3. The method according to claim 2, wherein the adding, in accordance with a determination that the update operation identifier in the piece of transaction data is an addition identifier, a predefined phrase corresponding to the addition identifier to the predefined phrase database comprises:
    searching the predefined phrase database according to the predefined phrase corresponding to the addition identifier in accordance with a determination that the update operation identifier in the piece of transaction data is the addition identifier, and adding the predefined phrase corresponding to the addition identifier to the predefined phrase database in accordance with a determination that the predefined phrase corresponding to the addition identifier is not comprised in the predefined phrase database.

4. The method according to claim 1, wherein the obtaining the update operation identifier and the predefined phrase in the target block comprises:
    obtaining, in accordance with a determination that the piece of transaction data in the target block carries a supervision identifier, the update operation identifier and the predefined phrase in the piece of transaction data.

5. The method according to claim 4, wherein the supervision identifier comprises a signature of a supervisory node device or an address of the supervisory node device.

6. The method according to claim 1, the method further comprising:
    filtering out, in accordance with a determination that the at least one piece of transaction data comprises first transaction data, the predefined phrase in the predefined phrase database from the first transaction data to obtain search feedback information, wherein the search feedback information comprises at least one piece of transaction data obtained after filtering, and the first transaction data is transaction data comprising any predefined phrase in the predefined phrase database.

7. The method according to claim 6, wherein the comparing at least one piece of transaction data in the block corresponding to the block number with a predefined phrase in the predefined phrase database comprises:

comparing, in descending order of weights of a plurality of predefined phrases in the predefined phrase database, the at least one piece of transaction data in the block with the plurality of predefined phrases one by one, wherein the weights are determined according to quantities of times that the predefined phrases are added.

8. The method according to claim 6, wherein the filtering out, in accordance with a determination that the at least one piece of transaction data comprises first transaction data, the predefined phrase in the predefined phrase database from the first transaction data to obtain search feedback information, wherein the search feedback information comprises at least one piece of transaction data obtained after filtering comprises:

replacing, in accordance with a determination that the at least one piece of transaction data comprises first transaction data, the predefined phrase in the first transaction data with a target warning phrase to obtain search feedback information, wherein the search feedback information comprises at least one piece of transaction data obtained after replacement.

9. A computer device, comprising a memory and a processor, the memory storing computer-readable instructions, the computer-readable instructions, when executed by the processor, causing the processor to perform a plurality of operations including:

receiving a piece of transaction data, the piece of transaction data carrying an update operation identifier and a predefined phrase corresponding to the update operation identifier;

obtaining, in accordance with a determination that a target block comprising the piece of transaction data is stored into a blockchain of a blockchain system, the update operation identifier and the predefined phrase in the target block;

updating a predefined phrase database according to the update operation identifier and the predefined phrase in the target block, comprising:

in accordance with a determination that the updated operation identifier in the piece of transaction data is a deletion identifier, deleting the predefined phrase corresponding to the deletion identifier from the predefined phrase database;

determining, according to a block number carried in a search request, a block corresponding to the block number on the blockchain of the blockchain system;

comparing at least one piece of transaction data in the block corresponding to the block number with the predefined phrase in the predefined phrase database; and deleting, in accordance with a determination that the at least one piece of transaction data comprises first transaction data, the predefined phrase in the predefined phrase database from the first transaction data to obtain search feedback information, wherein the search feedback information comprises at least one piece of transaction data obtained after deletion.

10. The computer device according to claim 9, wherein the updating a predefined phrase database according to the update operation identifier and the predefined phrase in the target block comprises:

adding, in accordance with a determination that the update operation identifier in the piece of transaction data is an addition identifier, a predefined phrase corresponding to the addition identifier to the predefined phrase database.

11. The computer device according to claim 10, wherein the adding, in accordance with a determination that the update operation identifier in the piece of transaction data is an addition identifier, a predefined phrase corresponding to the addition identifier to the predefined phrase database comprises:

searching the predefined phrase database according to the predefined phrase corresponding to the addition identifier in accordance with a determination that the update operation identifier in the piece of transaction data is the addition identifier, and adding the predefined phrase corresponding to the addition identifier to the predefined phrase database in accordance with a determination that the predefined phrase corresponding to the addition identifier is not comprised in the predefined phrase database.

12. The computer device according to claim 9, wherein the obtaining the update operation identifier and the predefined phrase in the target block comprises:

obtaining, in accordance with a determination that the piece of transaction data in the target block carries a supervision identifier, the update operation identifier and the predefined phrase in the piece of transaction data.

13. The computer device according to claim 12, wherein the supervision identifier comprises a signature of a supervisory node device or an address of the supervisory node device.

14. The computer device according to claim 9, wherein the plurality of operations comprise:

filtering out, in accordance with a determination that the at least one piece of transaction data comprises first transaction data, the predefined phrase in the predefined phrase database from the first transaction data to obtain search feedback information, wherein the search feedback information comprises at least one piece of transaction data obtained after filtering, and the first transaction data is transaction data comprising any predefined phrase in the predefined phrase database.

15. The computer device according to claim 14, wherein the comparing at least one piece of transaction data in the block corresponding to the block number with a predefined phrase in the predefined phrase database comprises:

comparing, in descending order of weights of a plurality of predefined phrases in the predefined phrase database, the at least one piece of transaction data in the block with the plurality of predefined phrases one by one, wherein the weights are determined according to quantities of times that the predefined phrases are added.

16. The computer device according to claim 14, wherein the filtering out, in accordance with a determination that the at least one piece of transaction data comprises first transaction data, the predefined phrase in the predefined phrase database from the first transaction data to obtain search feedback information, wherein the search feedback information comprises at least one piece of transaction data obtained after filtering comprises replacing, in accordance with a determination that the at least one piece of transaction data comprises first transaction data, the predefined phrase in the first transaction data with a target warning phrase to obtain search feedback information, wherein the search feedback information comprises at least one piece of transaction data obtained after replacement.

17. A non-volatile computer-readable storage medium storing computer-readable instructions, the computer-readable instructions, when executed by one or more processors, causing the one or more processors to perform a plurality of operations including:
   receiving a piece of transaction data, the piece of transaction data carrying an update operation identifier and a predefined phrase corresponding to the update operation identifier;
   obtaining, in accordance with a determination that a target block comprising the piece of transaction data is stored into a blockchain of a blockchain system, the update operation identifier and the predefined phrase in the target block;
   updating a predefined phrase database according to the update operation identifier and the predefined phrase in the target block, comprising:
      in accordance with a determination that the updated operation identifier in the piece of transaction data is a deletion identifier, deleting the predefined phrase corresponding to the deletion identifier from the predefined phrase database;
   determining, according to a block number carried in a search request, a block corresponding to the block number on the blockchain of the blockchain system;
   comparing at least one piece of transaction data in the block corresponding to the block number with the predefined phrase in the predefined phrase database; and
   deleting, in accordance with a determination that the at least one piece of transaction data comprises first transaction data, the predefined phrase in the predefined phrase database from the first transaction data to obtain search feedback information, wherein the search feedback information comprises at least one piece of transaction data obtained after deletion.

18. The non-volatile computer-readable storage medium according to claim 17, wherein the updating a predefined phrase database according to the update operation identifier and the predefined phrase in the target block comprises:
   adding, in accordance with a determination that the update operation identifier in the piece of transaction data is an addition identifier, a predefined phrase corresponding to the addition identifier to the predefined phrase database.

19. The non-volatile computer-readable storage medium according to claim 18, wherein the adding, in accordance with a determination that the update operation identifier in the piece of transaction data is an addition identifier, a predefined phrase corresponding to the addition identifier to the predefined phrase database comprises:
   searching the predefined phrase database according to the predefined phrase corresponding to the addition identifier in accordance with a determination that the update operation identifier in the piece of transaction data is the addition identifier, and adding the predefined phrase corresponding to the addition identifier to the predefined phrase database in accordance with a determination that the predefined phrase corresponding to the addition identifier is not comprised in the predefined phrase database.

20. The non-volatile computer-readable storage medium according to claim 17, wherein the obtaining the update operation identifier and the predefined phrase in the target block comprises:
   obtaining, in accordance with a determination that the piece of transaction data in the target block carries a supervision identifier, the update operation identifier and the predefined phrase in the piece of transaction data.

* * * * *